Jan. 30, 1968   E. L. LUEHRING ET AL   3,366,848
HIGH ENERGY SUPPLY AND INTERLOCKING FOR PLURAL SOLENOIDS
Filed March 26, 1965

INVENTORS
HARVEY C. KAPLAN
ELMER L. LUEHRING
BY
Richard MacCutcheon
ATTORNEY

United States Patent Office 3,366,848
Patented Jan. 30, 1968

3,366,848
HIGH ENERGY SUPPLY AND INTERLOCKING FOR PLURAL SOLENOIDS
Elmer L. Luehring and Harvey C. Kaplan, Cleveland Heights, Ohio, assignors to Joslyn Mfg. and Supply Co., Chicago, Ill., a corporation of Illinois
Filed Mar. 26, 1965, Ser. No. 443,050
6 Claims. (Cl. 317—151)

ABSTRACT OF THE DISCLOSURE

A dual energy storage system has dual capacitors (17, 20) which for preferred sequence use are interlocked by an energy sensing device (25) so that power can not be taken from one (20) as for closing an associate power switch unless power is available at the other (17) as for opening said switch, thus to provide fail-safe operation of associate apparatus such as said power switch (11, 14, 1).

Background of the invention

The present invention relates to electric supply systems and has significance in connection with switch apparatus such as heavy duty fault interrupters having plural solenoids, for example to open and to close.

It has previously been known to use a capacitor or battery as a stand-by source of electrical energy, e.g., for tripping a circuit breaker. Thus if so-called control power be lost, the circuit breaker can still be tripped open if that be desired. It cannot be denied that there are advantages in localized power supplies among which might be listed stand-by availability, minimal amperage requirements of (and wire sizes from) any external source used to feed the energy storage devices. Further, the provision of local energy storage means makes a high demand device such as a solenoid more universal, by providing impedance matching with an infinite range of ratios and external source need supply only low power over a relatively long time in order to satisfy the high energy requirements which are assumed to occur only rarely and then for relatively short time periods. Heretofore, however, and particularly in situations where there is already a capacitor used to supply power to open a switch, capacitors have not been used to supply power for switch closing, and even the use of a battery for such a function presents problems of economics.

It is an object of the present invention to provide simple and inexpensive means for overcoming the above mentioned difficulties.

Another object is to provide a control system of the type having energy storage means for switch opening together with energy storage means for switch closing whereby to allow either to operate in case of loss of power.

Another object is to provide energy storage means for switch opening and switch closing with provision whereby the switch cannot be closed unless the energy be instantly available for switch opening.

Other objects and advantages will become apparent and the invention may be better understood from consideration of the following description taken in connection with the accompanying drawing, in which.

Figure 1:
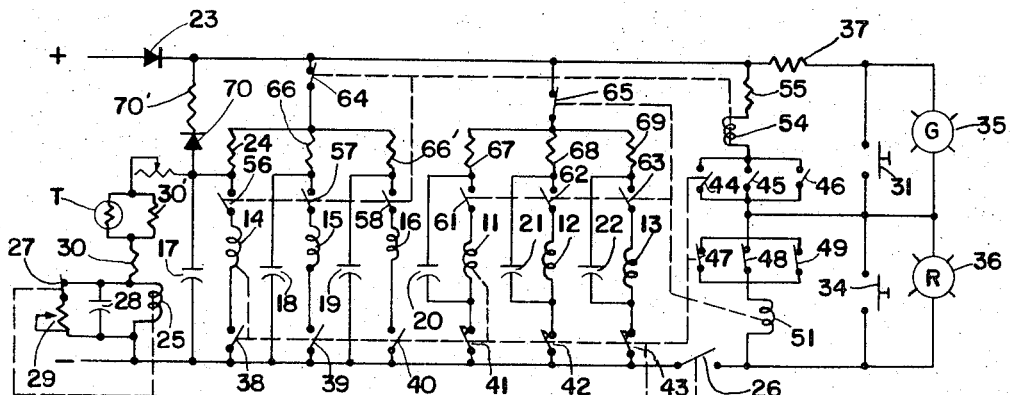
FIG. 1 is a schematic diagram of the control portion of a preferred embodiment.

Referring first to FIG. 1, the apparatus to be controlled is assumed to be a conventional high voltage, high current three-phase switch having three main contact assemblies 1, 2 and 3, respectively arranged to be closed by respective close solenoid coils 11, 12 and 13, and to be opened by respective trip solenoid coils 14, 15 and 16. Energy to operate the opening solenoid 14 is supplied by a capacitor 17, that to open contact assembly 2 through solenoid 15 by a capacitor 18. Similarly capacitors 19, 20, 21, 22 supply solenoids 16, 11, 12, 13, respectively, as shown in FIG. 1. An external source of energy is assumed connected to the lines marked "+" and "−." A diode 23 prevents discharge of the capacitors later to be described into the external source system if there happens to be a fault in that system, and also makes the control more universal in making it possible to use it with an A.C. (e.g., transformer) supply if that be desired.

Considering first the slowly refillable, relatively rapidly depletable energy source provided by trip capacitor 17 which is connected across the line while in series with a charging resistor 24, and a later to be described interlocking contact 64; a capacitor 17 charge sensing element is provided by a relay having a coil 25 which is operative to close n.o. relay contact 26 and to open n.c. relay contact 27, with the speed of relay response controlled by a capacitor 28 and, in series with contact 27, a manually adjustable potentiometer 29. The series circuit of a resistor 30, thermistor T and thermistor shunt resistor 30' provides thermal compensation in a well known manner.

Initiation of operation of the main switch is commenced by operation of a Control Switch Close 31 or of a Control Switch Trip 34 which are shown as push buttons merely for simplicity, though they might, instead, themselves be operated from remote locations by telemetry, overload, underload, or whatever. Also shown provided are indicating lights 35, 36, respectively, and a protective resistor 37. The main switch (1–3) is, as is conventional, provided with normally open (when main switch is open in its respective phase) auxiliary contacts labeled in FIG. 1 as 38–40 and is also provided with normally closed (when the respective phase main contacts are open) auxiliary switches 41–43. The main switch is also provided with n.o. auxiliary contacts 44–46 and n.c. auxiliary contacts 47–49.

As seen in FIG. 1, a close contactor has a coil 51 and a trip contactor has a coil 54. A protective resistor 55 can conveniently be replaced by a jumper when the external energy source is of relatively low voltage, thus making the control more universal.

It will be observed that closure of 31 will energize 51, providing the main switch or any one of its phases is open so that at least one of 47–49 is closed, and that closure of 34 will energize trip contactor coil 54 providing the main switch is closed in at least one of its phases. Energizing the trip contactor coil 54 closes each of three associated contacts 56, 57, 58. This will, since the main contacts are closed, and consequently the n.o. main switch auxiliary contacts 38–40 are closed, expose the trip solenoids 14, 15, 16 to the large amount of energy available to operate them and assumed stored in the capacitors 17, 18, 19, each of which might have a capacity on the order of 8600 mfd. for a 125-volt control system or 1650 mfd. for a 230 to 250-volt control system. Actually though, some economies are achieved if the production is standardized at the larger capacity values, so that the control system can be made substantially independent of actual voltage of external energy source in the field, A.C. or D.C.

Close solenoids 11–13 may be rated the same as the trip solenoids and, as seen in FIG. 1, energizing the close contactor coil 51 closes each of three associated contacts 61, 62, 63.

Large solenoid coils (e.g., 11–16) themselves store considerable energy, though this effect be but momentary, but the illustrated arrangements prevent inductive kickback from the solenoids to the external control power source when the trip contactor coil 54 or close contactor coil 51 is energized, by providing a trip contactor n.c. contact 64 in the circuit between external source and trip solenoids, and a close contactor n.c. contact 65 in the circuit between external source and close solenoids. The circuit for storage means and for energy absorbers is substantially the same for the close as for the open solenoids, except that for closing energy capacitors we have shown no sensing element. Further, the close circuits are operative only when main contacts are open so that at least one of the normally closed auxiliary contacts 49–49 are closed and at least one of the n.c. auxiliary contacts 41–43 are closed.

Since the trip capacitor 17 is the only local energy source whose charge is "sensed," we prefer to have it charge slower than any other local source. To this end its charging resistor 24 preferably has a higher ohmic rating (e.g., 500 ohms) than that of the charging resistors 66–69 (e.g., 100 ohms each) which are provided for the other principal capacitors, 18–19 and 20–22, respectively.

Further, in order that trip contactor coil 54 and/or close contactor coil 51 can always be energized despite the event of loss of external source control voltage power, a rectifier diode 70 operable through a fifty-ohm resistor 70' is provided to allow bleeding from capacitor 17 the small amount of energy required for this purpose.

Figure 2:
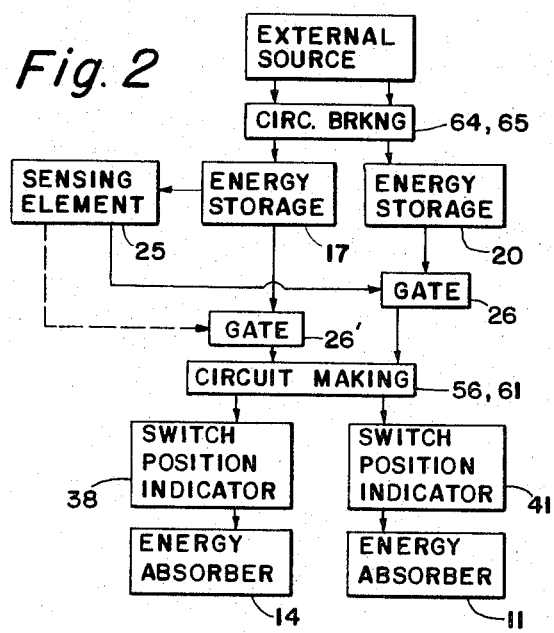
FIG. 2 is a simplified block diagram of an arrangement according to the invention.

Referring now to the block diagram of FIG. 2, like functioning parts are like numbered as in FIG. 1. An external energy source supplies a local energy source 17 and a local energy source 20. Whether or not there is a gate (26') in the circuit from energy source 17 to the energy absorber 14 (and which feature is somewhat optional because 14 can not absorb energy unless 17 is charged to provide it), we prefer that there be a gate (26) arranged responsive to the condition (as measured at 25) of the charged source for one circuit (as that shown for 14) and effective in another circuit (as shown, and according to the preferred embodiment, effective in the circuit between 20 and 11).

Figure 3:
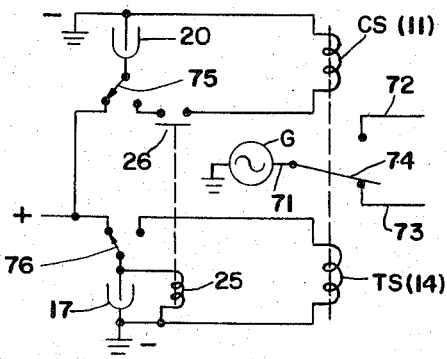
FIG. 3 is a grossly simplified schematic of an arrangement according to one aspect of the invention.

Suppose, for example, and as indicated in the crude schematic of FIG. 3, a generator G feeds a line 71 connected to the common arm of a switch operable to connect 71 with one line 72 or another line 73 according to energization of a large solenoid which we will call close solenoid CS, or of another large solenoid which we will call trip solenoid TS, the two oppositely controlling common switch arm 74. A pair of control selector switches 75, 76, respectively serve to either charge the associate capacitor (20, or 17) from a low power control line indicated by the symbols "+" and "—", to energize the respective solenoid (CS, or TS) from the associate capacitor but, in one case, only if the other capacitor is able to immediately energize its solenoid. Then, having a sensing element (25) responsive to capacitor 17 and having the sensing element control (through 26) the circuit from the capacitor 20 to the CS solenoid, the desired condition has been achieved. But the main switch position indication interlocks, and other features already disclosed, for example in FIG. 1, make the apparatus more dependable, and are preferred.

Figure 4:
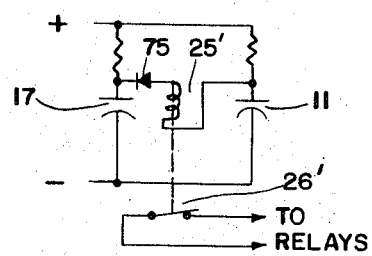
FIG. 4 represents a modification.

FIG. 4 shows a modification in which a sensor is shown having a contact 26' controlling coil 25' arranged responsive to the difference in charge between capacitors. The contact 26' is n.c. (rather than being like the arrangement in FIG. 1 where 26 is normally open). Thus a permissive circuit for relaying (not shown in FIG. 4) exists when both capacitors are adequately charged, while no harm is done in establishing the same permissive circuit if neither capacitor is charged (because then the main switch can not be closed anyway). But, with the FIG. 4 arrangement, if only the closing capacitor is adequately charged, the apparatus is rendered inoperable, while if only the tripping capacitor is charged there is, because of the block presented by a diode 75, still permissivity for the relaying circuitry to occasion main switch tripping.

In operation (see FIG. 1), the opening solenoid 14 is supplied by capacitor 17. Before the interrupter can be closed electrically, the capacitor 17 will have been charged to insure that the interrupter can be opened at any time. Upon closure of the (e.g., used supplied) control contact 34 the trip contactor coil 54 is energized through resistor 55, auxiliary contact 44, and relay contact 26. Energization of 54 causes normally closed contact 64 to open capacitor 17's charging circuit, and also closes the normally open contact 56 thereby energizing the trip solenoid 14 through auxiliary contact 38. As the main switch mechanism operates and the main switch contacts are opening, the auxiliary switch 38 opens, de-energizing the opening solenoid 14.

As capacitor 17 discharges into trip solenoid 14, the voltage across sensor coil 25 drops, allowing the sensor relay to move to the de-energized position. The relay contact 26 in series with the control contactor coils 51 and 54 then opens, to prevent a closing operation until the tripping capacitor C1 is fully charged.

Energy to operate the closing solenoid 11 is supplied by capacitor 20. Capacitor 20 can be charged only after the main switch is in the open position. Capacitor 20 is charged through resistor 67, normally closed relay contact 65, and main switch auxiliary contact 41. Upon closure of the (e.g., user supplied) control switch 31, the close contactor coil 51 is energized through resistor 37, auxiliary contact (e.g., 47) and relay contact 26. Relay contact 26 is closed when the capacitor 17 is fully charged. Energization of the close contactor coil 51 causes normally closed contact 65 to open the capacitor 20 charging circuit, and normally open contact 61 to close, energizing the close solenoid 11. As the main switch operates, and the main switch contacts are closing, the main switch auxiliary contacts 47–49 open, de-energizing the close contactor coil 51. Another auxiliary switch contact 41 opens, to prevent capacitor 20 from recharging.

Operations for the other phases, main switch contacts 2 and 3 (in FIG. 1) are the same as that just described for switch contact 1, except that it is only the charge of the first to charge capacitor (17) which needs to be sensed with the preferred and disclosed arrangement.

There is thus provided apparatus of the class described capable of meeting the objects above set forth. With use as an automatic fault interrupter, if there is a main line fault (assumed to give a main breaker "open" signal by closing 34), the main breaker will open and stay open until the "open" signal is removed. The high energy system has low external power source requirements and, moreover, various safeguards are built in, such as the fact that a close solenoid capacitor (e.g., 20) can not be energized unless both the close contactor coil 51 is de-energized and the main switch is open, whereas a trip solenoid capacitor (e.g., 14) can be energized from external supply whether the main switch is open or closed just so long as trip contactor coil 54 is de-energized.

While we have illustrated and described particular embodiments, various modifications may obviously be made without departing from the true spirit and scope of the invention which we intend to have defined only by the appended claims taken with all reasonable equivalents.

For use on a moderately high voltage line where phase separation need not be great, simplification over the three separate phase main switches assumed for FIG. 1 are possible, e.g., by mechanically connecting main switch contacts and using only two solenoids, but the principles of operation are substantially the same. The local energy sources might be either the capacitors shown, or batteries, or other storage devices. While batteries have the advantage of chemical rejuvenation (even without outside energy source application), capacitors not only have the advantage of lower cost but also the advantage of converting D.C. to a pulse which looks like A.C. That is, with energy supply derived from a capacitor, capacitor and solenoid oscillate as a tank circuit, and numerous current zeroes are available for control circuit interruption with low cost control equipment, A.C. solenoids are advantageously usable, and large control circuit contacts are not required and the solenoids are not likely to burn up or otherwise fail because ultimately the capacitors supply no current to interrupt, and thus the use of protective fuses or circuit breakers is obviated.

As the words "responsive to energy level of," are used in the claims hereinafter, we mean to cover the usual case where the response (e.g., of sensor) is merely a function (e.g., square root) of charge (e.g., of a capacitor), and as the word "automatic" is used we mean to cover any system of relay or switch auxiliary contacts not directly controlled manually even though adustments, or initial inputs signaling, might be made by hand.

We claim:

1. In a fault interrupter of the type having a first solenoid for opening and a second solenoid for closing the interrupter, and having a first capacitor connectable for energizing said first solenoid and a second capacitor connectable for energizing said second solenoid, and having circuit making and breaking means for controlling connections for selectively energizing either solenoid from its associate capacitor, the element of novelty of:
   a relay having a coil (25) arranged in shunt circuit with respect to at least one of said capacitors, said relay coil having associate contacts (26, 51, 65, 61) controlling the series circuit between at least one of said actuators (11) and its associate capacitor (20).

2. In a fault interrupter as in claim 1, the further characterization of the relay coil having a rectifier in series therewith, with the coil and rectifier circuit being arranged in shunt with a series connection of both the capacitors.

3. In an electrical switch assembly,
   an external energy source line,
   a first energy storage capacitor (17) normally connected to said external energy source line,
   a second energy storage capacitor normally connected to said external energy source line,
   a set of main contacts,
   a solenoid device (14) mechanically connected to open said main contacts,
   a solenoid device (11) mechanically connected to close said main contacts,
   circuit making means (54–56) for selectively connecting said first energy storage capacitor (17) to the solenoid device (14) connected to open the main contacts,
   circuit making means (51–61) for selectively connecting said second energy storage capacitor (20) to said solenoid device (11) connected to close the main contacts, and
   sensing means connected to read level of energy stored in said first energy storage capacitor, said sensing means being connected to gate the circuit making means for connecting the second energy storage capacitor to the close solenoid device in such a sense as to prevent main contact closure except when sufficient energy is available in the first energy storage capacitor to open said main contacts.

4. An electrical switch assembly as in claim 3 further characterized by automatic circuit making means for permitting changing one energy storage device for one position of the main switch contacts and for permitting changing of both energy storage devices for other position of the main contacts.

5. In an energy supply and control system for a two solenoid operated switch,
   a first solenoid mechanically connected to open said switch,
   a second solenoid mechanically connected to close said switch,
   first circuit making means connected to the first solenoid,
   second circuit making means connected to the second solenoid,
   a first energy storage means connected to supply the first circuit making means,
   a second energy storage means connected to supply the second circuit making means,
   a line connectable to an external power source,
   third circuit making means electrically connected to said line and to the second energy storage means and mechanically connected responsive to main switch position for allowing charging of said second storage means but only when the main switch is open,
   and fourth circuit making means electrically connected to said line and to first energy storage means and mechanically connected to be operated by the first solenoid for allowing changing of said first storage means whether the main switch is open or closed but not when said first storage means is supplying energy to its respective solenoid.

6. In a low line power requirement system having a low power line,
   a pair of first and second relatively high energy absorption electromechanical device actuators (TS14 and CS11, FIG. 3),
   a pair of first and second capacitors (17, 20) each electrically connected to, and for operating, a different one of said actuators when the respective capacitor is substantially charged from the low power line,
   first switching means (76) having a first mode of operation which connects the first capacitor to the line and having a second mode of operation which connects said first capacitor to the first actuator,
   second switching means (75) having a first mode of operation which connects the second capacitor to the line and having a second mode of operation which connects said second capacitor to the second actuator, said second switching means also including an interlock (26) which is electromechanically responsive to the charge on the first capacitor and which is electrically connected in series circuit between the second capacitor and the second actuator during the second switching means second mode of operation.

References Cited

UNITED STATES PATENTS

| | | | |
|---|---|---|---|
| 2,645,744 | 7/1953 | Cassidy | 317—137 |
| 2,773,221 | 12/1956 | Shaw | 317—135 |
| 3,084,311 | 4/1963 | Culbertson | 317—148.5 |

MILTON O. HIRSHFIELD, *Primary Examiner.*

J. A. SILVERMAN, *Assistant Examiner.*

UNITED STATES PATENT OFFICE
CERTIFICATE OF CORRECTION

Patent No. 3,366,848                                        January 30, 1968

Elmer L. Luehring et al.

It is certified that error appears in the above identified patent and that said Letters Patent are hereby corrected as shown below:

In the sheet of drawings, Fig. 4, legend "11" should read -- 20 --. Column 3, line 13, "49-49" should read -- 47-49 --; line 52, before "to" insert -- or --. Column 4, line 7, "used" should read -- user --; line 44, "first" should read -- last --. Column 5, line 49, "54-56" should read -- 54, 56 --; line 54, "51-61" should read -- 51, 61 --. Column 6, line 29, "changing" should read -- charging --.

Signed and sealed this 16th day of September 1969.

(SEAL)
Attest:

Edward M. Fletcher, Jr.                                  WILLIAM E. SCHUYLER, JR.
Attesting Officer                                                   Commissioner of Patents